United States Patent
Bresinski et al.

(10) Patent No.: US 9,500,558 B2
(45) Date of Patent: Nov. 22, 2016

(54) METHOD AND DEVICE FOR MEASURING THE LIGHT GAP TIGHTNESS OF PISTON RINGS

(71) Applicant: FEDERAL-MOGUL BURSCHEID GMBH, Burscheid (DE)

(72) Inventors: Sebastian Bresinski, Langenfeld (DE); Markus Kellner, Leverkusen (DE); Jens Picard, Wuppertal (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 117 days.

(21) Appl. No.: 14/361,956

(22) PCT Filed: Dec. 6, 2012

(86) PCT No.: PCT/DE2012/001171
§ 371 (c)(1),
(2) Date: May 30, 2014

(87) PCT Pub. No.: WO2013/104348
PCT Pub. Date: Jul. 18, 2013

(65) Prior Publication Data
US 2015/0122045 A1    May 7, 2015

(30) Foreign Application Priority Data

Jan. 11, 2012 (DE) .......................... 10 2012 000 332

(51) Int. Cl.
*G01M 3/38* (2006.01)
*G01M 13/00* (2006.01)

(52) U.S. Cl.
CPC ............... *G01M 3/38* (2013.01); *G01M 13/00* (2013.01); *G01M 13/005* (2013.01)

(58) Field of Classification Search
CPC .......... G01B 11/24; G01B 11/16; F16J 9/00; G01M 3/38
USPC .......................................................... 73/800
See application file for complete search history.

(56) References Cited

U.S. PATENT DOCUMENTS

| | | |
|---|---|---|
| 2,433,558 A | 12/1947 | Hurley, Jr. |
| 2,441,343 A | 5/1948 | Becker |
| 2,487,628 A | 11/1949 | Aller |
| 2,487,629 A * | 11/1949 | Aller ..................... G01B 11/16 209/555 |
| 2,558,226 A | 6/1951 | Sparrow |

(Continued)

FOREIGN PATENT DOCUMENTS

| | | |
|---|---|---|
| CN | 201348498 | 11/2009 |
| DE | 148 982 | 7/1986 |

(Continued)

*Primary Examiner* — Lisa Caputo
*Assistant Examiner* — Octavia Hollington
(74) *Attorney, Agent, or Firm* — Norris McLaughlin & Marcus, P.A.

(57) ABSTRACT

A method and an apparatus for measuring the light gap tightness of a piston ring, that is provided with a joint and produced so as to be non-round by clamping the open piston ring, while substantially closing the joint, by way of an accessory device in the circumferential direction, and by exerting a defined force in the region of at least one of the joint ends of the piston ring in the direction of a wall of the accessory device, wherein optical means are used to establish whether the joint region of the piston ring which is subjected to the action of the force is seated against the wall of the accessory device in a light-tight manner.

9 Claims, 3 Drawing Sheets

(56) References Cited

U.S. PATENT DOCUMENTS

| | | | |
|---|---|---|---|
| 5,380,018 A * | 1/1995 | Mader | F16J 9/12 277/467 |
| 7,096,553 B1 | 8/2006 | Carruth | |
| 8,979,094 B2 * | 3/2015 | Esser | F16J 9/12 277/440 |
| 9,133,933 B1 * | 9/2015 | Feistel | F16J 9/18 |

FOREIGN PATENT DOCUMENTS

| | | |
|---|---|---|
| DE | 100 30 368 | 1/2002 |
| GB | 1 504 974 | 3/1978 |

* cited by examiner

METHOD AND DEVICE FOR MEASURING THE LIGHT GAP TIGHTNESS OF PISTON RINGS

BACKGROUND OF THE INVENTION

The invention relates to a method for measuring the light tightness of a piston ring that is provided with a joint and created so as to be non-round.

DD 148 982 B1 discloses a measuring system for determining impermissible gaps between rotation-symmetrical components, in particular for checking the sealing gaps of piston rings, using a light source and a photoreceiver. The piston ring to be checked is clamped into a ring gauge, and the optical axis of a pulsed light source is directed at the gap between the piston ring and the ring gauge by means of an interposed lens system, wherein a test receiver is disposed opposite the gap in the optical axis, the analog electrical signal of the test receiver, which is dependent on the gap width, being supplied to a selective amplifier, wherein it is possible, by means of a known electronic circuit, to retrieve, store and display the analog electrical signals that are detected over the course of a rotation of the ring gauge based on the circumference.

A method for ascertaining the shape-conforming capability of piston rings in a non-round cylinder liner became known from DE 100 30 368 A1. For this purpose, a dimensionally stable test liner is provided and accommodated in a shape testing device. The inner surface of the test liner is provided with an exactly circular cylindrical section corresponding to the nominal diameter of the piston ring and, axially adjoining, with a slight non-round section having four curved convexities of approximately 20 µm. The cross-sectional surface enclosed by an inscribable circle and by the convexities is used as a reference surface. The profile progression of the inner surface of the piston ring over the non-round section circumference is ascertained by way of conventional shape measurement of the piston ring that is inserted in the non-round test liner.

When piston rings are produced, high manufacturing capability must be available to maintain the light tightness under operation, which is associated with significant costs. Even piston rings that are produced at a high manufacturing level must be subjected to a light tightness check at least occasionally, so as to establish in this way to what degree impermissible tolerances have arisen in the manufacturing process.

SUMMARY OF THE INVENTION

It is the object of the invention to provide a method which makes it possible to check whether a piston ring is still suited for operation or must be regarded as scrap, even when larger manufacturing tolerances are accepted in the production of piston rings. Moreover, a device that operates according to the method and has a simple design is to be provided.

This object is achieved by a method for measuring the light tightness of a piston ring that is provided with a joint and produced so as to be non-round by clamping the open piston ring, while substantially closing the gap, by means of an accessory device in the circumferential direction, and by exerting a defined force in the region of at least one of the joint ends of the piston ring in the direction of a wall of the accessory device, wherein optical means are used to establish whether the joint region of the piston ring which is subjected to the action of the force is seated against the wall of the accessory device in a light-tight manner.

A device operating according to this method is characterized in that the accessory device is a control ring surrounding the piston ring, wherein a roller, which can be fed at least in the direction of the control ring, is positioned radially inside the control ring.

An alternative device operating according to this method is characterized in that the accessory device is a control ring surrounding the piston ring, and that a rigid body, comprising two pressure elements that are directed at the joint ends, can be fed radially in the direction of the joint ends within the control ring.

As a result of the method according to the invention and the alternative devices operating according to the same, it is now possible to establish whether a piston ring that is produced with larger tolerances is nonetheless sufficiently light-tight so as to still be suitable for the operating condition in an engine.

The action of the force on the particular joint end advantageously takes place radially from the inside.

According to a further idea of the invention, the respective joint region is pressed against the wall of the accessory device, which in particular is designed as a control ring, using a force between 0.5 and 50 N.

The amount of the force here is dependent on the diameter, the material of the piston ring and the radial wall thickness of the piston ring to be measured.

If needed, the method according to the invention can be integrated into the light gap testing process of pistons that is subsequently carried out anyhow, without any major complexity.

From a technical point of view, several embodiments for testing the light tightness of a piston ring exist, which are described hereafter:
 roller(s), which can be rotated if needed, and which can be fed to one joint end or both joint ends; and
 rigid body/bodies provided with pressure elements, which can be fed in the direction of the two joint ends.

The person skilled in the art will make the solution that has the simplest design and is also the most economical one available, depending on the application.

By analogy to the prior art according to DD 148 982 B2, with the method according to the invention, it is also possible to provide an optical source at approximately 90° with respect to the clamped piston ring, the source being operatively connected to a photoreceiver device.

The subject matter of the invention is shown in the drawings based on an exempla y embodiment and is described as follows.

BRIEF DESCRIPTION OF THE DRAWINGS

In the drawings.

FIGS. 1 and 2 show simplified schematic diagrams of a device 1 for measuring the light tightness of a piston 3 that is provided with a joint 2. The device 1 comprises an accessory device 1' in the form of a control ring, which has a cylindrical inner circumferential surface 4. The one joint end 5 of the piston ring 3 is initially bent radially inward as is the other joint end 6 of the piston ring 3. A roller 7 is used, which can be rotated if needed, and which can be moved in the circumferential direction and, in any case, has been fed radially in the direction of the joint end 5 and will be fed radially in the direction of the joint end 6. When a defined force is applied, which in the present example is 2 N, the joint end 6 of the piston ring 3 is pressed against the cylindrical circumferential surface 4 of the control ring 1'. If the non-tight joint region 5, 6 is pressed against the inner circumferential surface 4 of the control ring 1' by the application of the defined force F, light tightness is effected and the piston ring 3 is suitable for the operating condition.

An optical monitoring system is used, which scans at least one defined circumferential section of at least one of the joint ends in relation to the surrounding wall of the control ring.

Figures 2A, 2B:
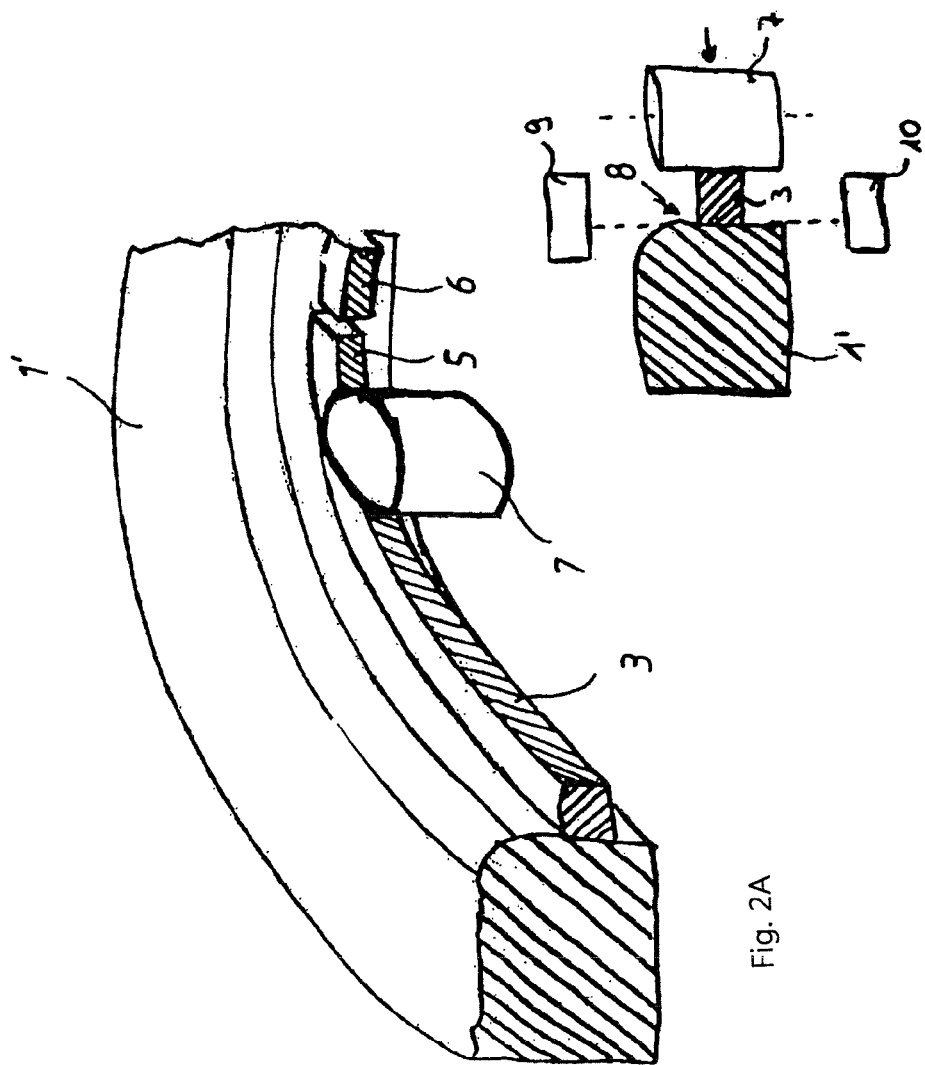

FIG. 2B shows, in a generalized form, an exemplary optical measuring device, comprising a light-emitting light source 9 that is directed toward a possible gap 8 and a light-sensitive component 10, such as a photoreceiver.

Figure 1:
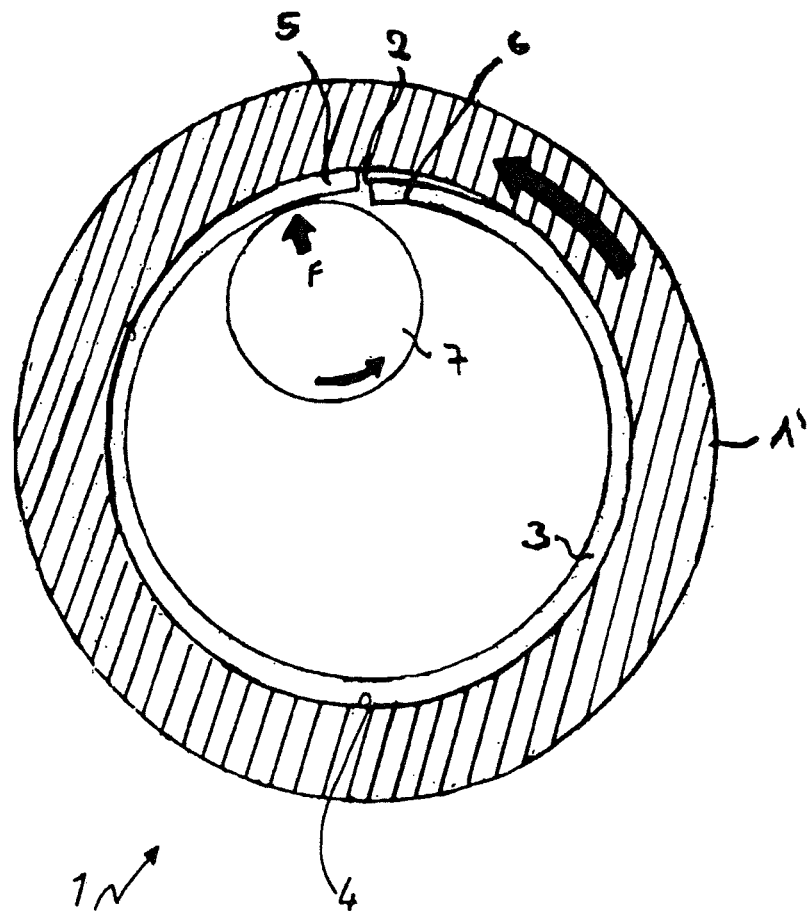
FIGS. 1 and 2A, 2B are schematic diagrams of a device for the light tightness measurement of piston rings.
Figure 3:
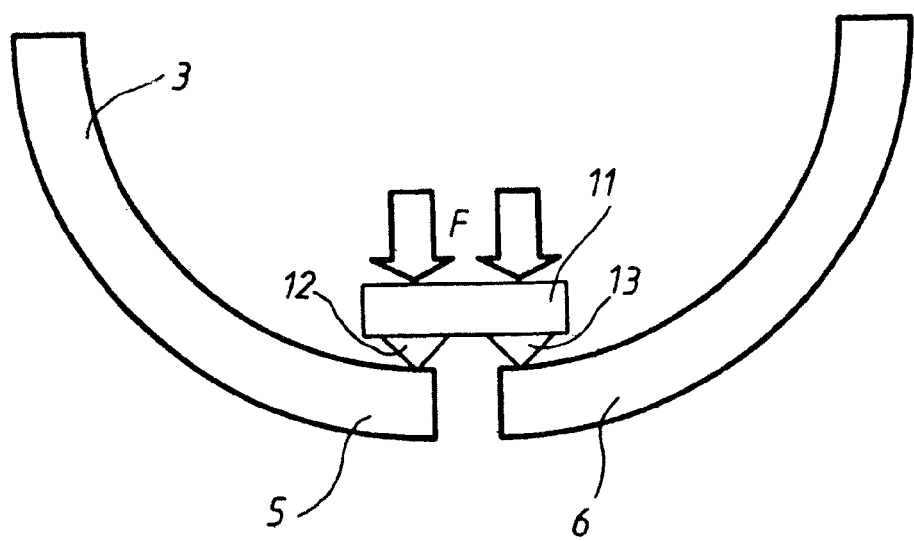
FIG. 3 shows an alternative device for measuring the light tightness of piston rings.

FIG. 3 shows an alternative to FIG. 1. Here, the control ring 1' shown in FIG. 1 is not visible. In this example, a rigid body 11, comprising two pressure elements 12, 13 acts on the joint ends 5, 6 of the piston ring 3. The joint ends 5, 6 are simultaneously pressed against the wall of the surrounding control ring. The pressure elements 12, 13, here assume the function of the roller 7 shown in FIGS. 1 and 2, the effectiveness being the same in both instances.

The invention claimed is:

1. A method for measuring light tightness of a piston ring provided with a joint and which is non-round when produced whereby the joint is open with ends of the joint radially offset from each other and circumferentially offset from each other, comprising:
    positioning the piston ring having an open joint within an accessory device having an inner circular surface of diameter corresponding to an external diameter of the piston ring as per a configuration of the piston ring with the joint closed,
    clamping the piston ring having the open joint against the inner circular surface of the accessory device,
    applying a force to an inner circumferential surface of the piston ring along a length of the piston ring toward at least one of the joint ends, said force being applied in a radially outward direction toward the inner circular surface of the accessory device and being of at least sufficient magnitude to substantially close the joint, and
    detecting by optical devices whether the joint to which the force is applied is seated against the inner circular surface of the accessory device in a light-tight manner.

2. The method according to claim 1, wherein the accessory device comprises a control ring and the force is 0.5 to 50 N.

3. The method according to claim 1, wherein the force is applied by at least one roller which is fed radially toward joint.

4. The method according to claim 3, the force is applied by two rollers, each of which acts on a respective one of the joint ends.

5. The method according to claim 3, wherein the force is applied by a rigid body comprising two pressure elements fed radially toward the joint and each of which acts on a respective one of the joint ends.

6. An apparatus for carrying out a method for measuring light tightness of a piston ring provided with a joint and which is non-round when produced whereby the joint is open with ends of the joint radially offset from each other, comprising
    positioning the piston ring having an open joint within an accessory device having an inner circular surface of diameter corresponding to an external diameter of the piston ring as per a configuration of the piston ring with the joint closed,
    clamping the piston ring having the open joint against the inner circular surface of the accessory device,
    applying a force to an inner circumferential surface of the piston ring along a length of the piston ring toward at least one of the joint ends, said force being applied in a radially outward direction toward the inner circular surface of the accessory device and being of at least sufficient magnitude to substantially close the joint, and
    detecting by optical devices whether the joint to which the force is applied is seated against the inner circular surface of the accessory device in a light-tight manner, the apparatus comprising:
    a control ring having an inner circular surface and comprising the accessory device in which the piston ring having the open joint is positioned;
    a roller arranged within the control ring to apply said force to said inner circumferential surface of the piston ring along said length of the piston ring toward at least one of the joint ends, said force being applied in said radially outward direction toward the inner circular surface of the accessory device and being of at least sufficient magnitude to substantially close the joint; and
    and an optical system arranged to detect whether the joint subject to said force is seated against the inner circular surface of the control ring in a light-tight manner.

7. The apparatus of claim 6, wherein the optical system comprises an optical monitoring system which scans a defined circumferential section of the joint including at least one of the joint ends in relation to a section of the inner circular surface of the control ring surrounding said joint ends circumferential section.

8. An apparatus for carrying out a method for measuring light tightness of a piston ring provided with a joint and which is non-round when produced whereby the joint is open with ends of the joint radially offset from each other, comprising positioning the piston ring having an open joint within an accessory device having an inner circular surface of diameter corresponding to the diameter of the piston ring as per a configuration of the piston ring with the joint closed, clamping the piston ring having the open joint against the inner circular surface of the accessory device and applying a force to at least one of the joint ends in direction of the inner circular surface of the accessory device of at least sufficient magnitude to substantially close the joint, and detecting by optical devices whether the joint to which the force is applied is seated against the inner circular surface of the accessory device in a light-tight manner, the apparatus comprising
    a control ring having an inner circular surface and comprising the accessory device in which the piston ring having the open joint is positioned;
    a rigid body comprising two pressure elements directed at the joint ends, the rigid body being arranged within the control ring to be radially fed toward and against the joint with each of the pressure elements contacting an inner circumferential surface of the piston ring along a length of the piston ring toward a respective one of the joint ends with said force being applied in a radially outward direction toward the inner circular surface of the accesory device and being at least sufficient to close the joint;

and an optical system arranged to detect whether the joint subjected to said force is seated against the inner circular surface of the control ring in a light-tight manner.

9. The apparatus of claim 8, wherein the optical system rnmprises an optical monitoring system which scans a defined circumferential section of the joint including at least one of the joint ends in relation to a section of the inncr circular surface of the control ring surrounding said ends joint circumferential section.

* * * * *